United States Patent
Lee et al.

(10) Patent No.: US 9,080,647 B2
(45) Date of Patent: Jul. 14, 2015

(54) PULLEY STRUCTURE FOR WIRE COMBINATION

(71) Applicant: Hyundai Motor Company, Seoul (KR)

(72) Inventors: Dong Hyun Lee, Hwaseong-si (KR); Seung Hyun Baek, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 383 days.

(21) Appl. No.: 13/678,360

(22) Filed: Nov. 15, 2012

(65) Prior Publication Data

US 2014/0080644 A1 Mar. 20, 2014

(30) Foreign Application Priority Data

Sep. 17, 2012 (KR) .................. 10-2012-0102829

(51) Int. Cl.
*F16H 7/24* (2006.01)
*E05F 11/48* (2006.01)
*H02G 1/08* (2006.01)

(52) U.S. Cl.
CPC ................ *F16H 7/24* (2013.01); *E05F 11/483* (2013.01); *H02G 1/083* (2013.01)

(58) Field of Classification Search
CPC ... H02G 1/085; H02G 1/1202; H02G 1/1212; H02G 1/1214; H02G 1/1251; H02G 1/16
USPC .................. 254/134.3 FT, 134.3 R, 134.3 CL
See application file for complete search history.

(56) References Cited

U.S. PATENT DOCUMENTS

| 6,224,514 | B1 * | 5/2001 | Price | 482/50 |
| 2005/0081874 | A1 * | 4/2005 | Mathiez | 132/218 |
| 2010/0243377 | A1 * | 9/2010 | Duval | 185/37 |
| 2012/0217457 | A1 * | 8/2012 | Schena et al. | 254/338 |
| 2014/0080644 | A1 * | 3/2014 | Lee et al. | 474/121 |

FOREIGN PATENT DOCUMENTS

| JP | 61-159329 A | 7/1986 |
| JP | 6-320358 A | 11/1994 |
| KR | 1997-0043961 A | 7/1997 |
| KR | 10-0688081 B1 | 2/2007 |
| KR | 10-2007-0087974 A | 8/2007 |
| KR | 10-0851904 B1 | 8/2008 |
| KR | 10-2012-0050191 A | 5/2012 |

* cited by examiner

*Primary Examiner* — Lee D Wilson
(74) *Attorney, Agent, or Firm* — Morgan, Lewis & Bockius LLP

(57) ABSTRACT

A pulley assembly for combining of a wire, may include a groove member having a first guide groove helically threaded in an outer circumferential surface thereof and having a truncated cone shape, and a cylindrical guide pulley selectively combined with a bottom surface of the groove member and having a second guide groove formed on an outer circumferential surface thereof, wherein the wire may be configured to move to the second guide groove of the guide pulley along the first guide groove of the groove member when the groove member combined with the cylindrical guide pulley rotates in a direction.

4 Claims, 4 Drawing Sheets

PULLEY STRUCTURE FOR WIRE COMBINATION

CROSS-REFERENCE TO RELATED APPLICATION

The present application claims priority to Korean Patent Application No. 10-2012-0102829, filed on Sep. 17, 2012 in the Korean Intellectual Property Office, the entire contents of which is incorporated herein for all purposes by this reference.

BACKGROUND OF THE INVENTION

1. Field of the invention

The present invention relates to a pulley assembly for wire combination, and more particularly, to a pulley assembly for wire combination which can easily connect a cable wire with a pulley.

2. Description of Related Art

Generally, a pulley assembly for wire combination has been used for various fields, but has been mainly used for a door glass field.

The door glass is disposed between a door outer panel and a door inner panel in a vertically reciprocating manner.

A carrier plate is fixed to a lower end of the door glass and is connected with a door glass regulator motor via a wire rope.

When a switch disposed in the inside of a car is operated, an opening and closing operation of the door glass is performed by vertically moving the carrier plate along a regulator channel by pulling a wire rope while a regulator drum is rotated and a change in an angle of the wire rope is performed by the regulator pulley.

FIG. 1 is a diagram illustrating a pulley assembly for wire combination according to the related art.

As illustrated in FIG. 1, the pulley assembly for wire combination according to the related art includes a pulley 10 that is mounted on the door regulator, wherein an outer circumferential surface of the pulley 10 is provided with a guide groove 11 and an outer side of the pulley 10 is provided with a locking groove 12 that is connected with the guide groove 11.

As a result, when a wire W is assembled to the locking groove 12 of the pulley 10 and then, rotatably inserted, the wire W is combined with the guide groove 11.

However, the pulley assembly for wire combination according to the related art has a disadvantage in that it is difficult for the wire W to jump over the locking groove 12 of the pulley 10 and advance the guide groove 11 at the time of rotating the pulley 10, thereby reducing adhesion. Further, when the wire W is combined with the pulley 10, the wire W is locked to the locking groove 12 to increase the risk of damage.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a pulley assembly for wire combination so as to solve the above problems. In particular, one subject to be achieved by the present invention is to easily combine a cable wire with a pulley.

In an aspect of the present invention, a pulley assembly for combining of a wire, may include a groove member having a first guide groove helically threaded in an outer circumferential surface thereof and having a truncated cone shape, and a cylindrical guide pulley selectively combined with a bottom surface of the groove member and having a second guide groove formed on an outer circumferential surface thereof, wherein the wire is configured to move to the second guide groove of the guide pulley along the first guide groove of the groove member when the groove member combined with the cylindrical guide pulley rotates in a direction.

An outer diameter of the bottom surface of the groove member is formed to be larger than the outer circumferential surface of the guide pulley.

A combining protrusion is formed on the bottom surface of the groove member and a combining hole is formed in a lateral side of the guide pulley, wherein the combining protrusion of the groove member is selectively connected to with the combining hole of the guide pulley.

An end of the first guide groove formed on the outer circumferential surface of the groove member is connected with the second guide groove formed on the outer circumferential surface of the guide pulley when the groove member is combined with the guide pulley.

A top surface of the groove member is protrudedly formed with a bolt head.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
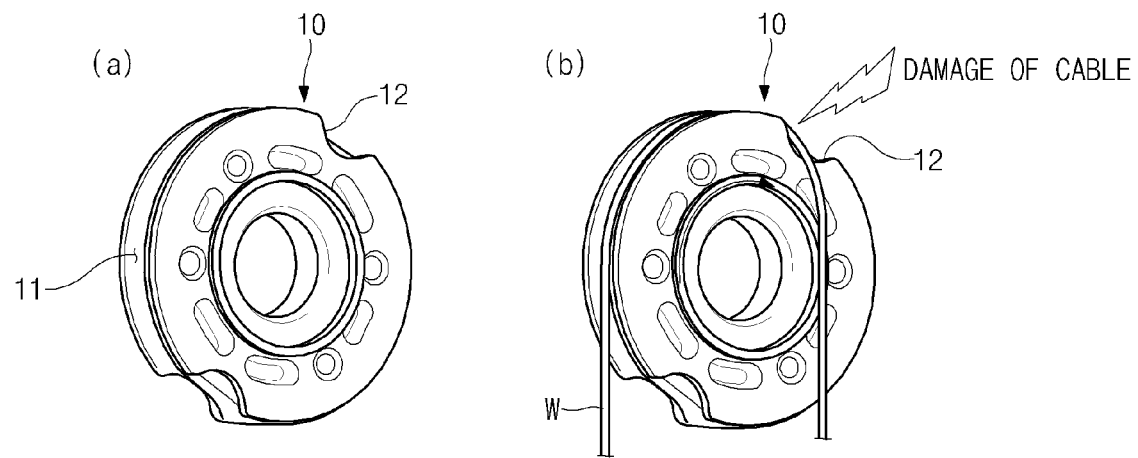
FIG. 1 is a diagram illustrating a pulley assembly for wire combination according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Embodiments of the present invention will be described in detail with reference to the accompanying drawings.

Figure 2:
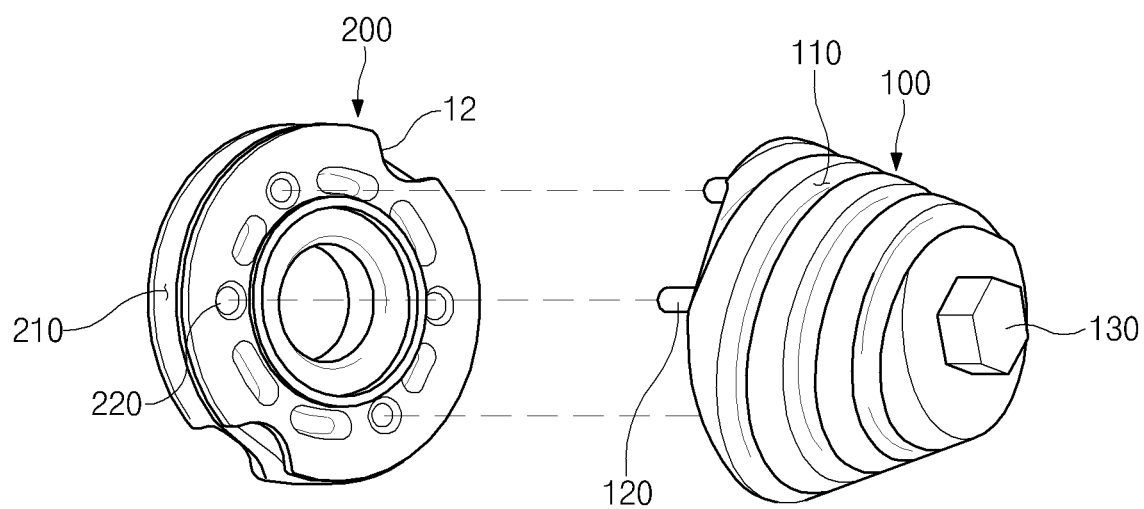
FIG. 2 is an exploded perspective view illustrating a pulley assembly for wire combination according to an exemplary embodiment of the present invention.
Figure 3:
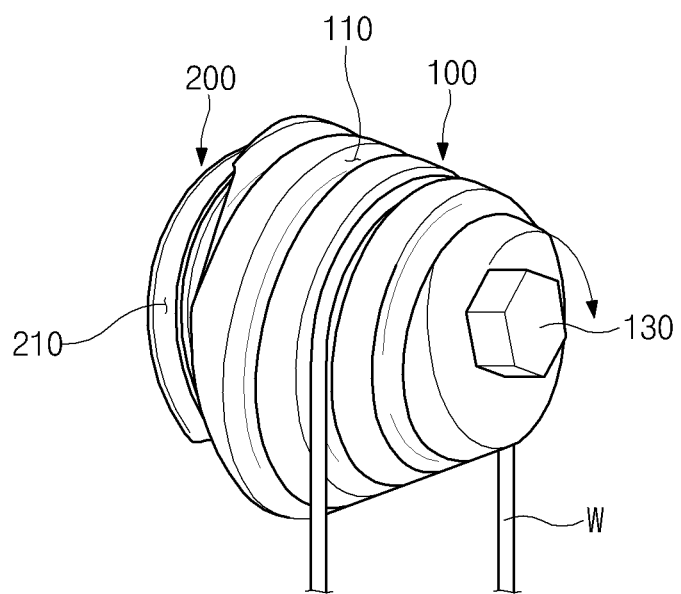
FIG. 3 is a diagram illustrating a pulley assembly for wire combination according to the exemplary embodiment of the present invention.
Figure 4:
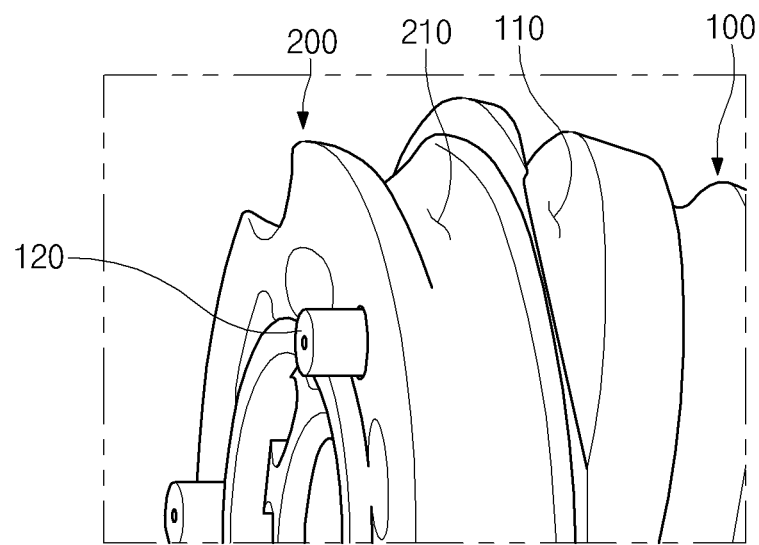
FIG. 4 is a diagram illustrating main parts of a pulley assembly for wire combination according to an exemplary embodiment of the present invention.

As illustrated in FIGS. 2 to 4, a pulley assembly for wire combination according to an exemplary embodiment of the present invention includes a groove member 100 having a first guide groove 110 formed on an outer circumferential surface thereof and a guide pulley 200 combined with the groove member 100 and having a second guide groove 210 formed on an outer circumferential surface thereof.

As illustrated in FIGS. 2 and 3, the groove member 100 has a truncated shape so that an outer diameter of a top surface of the groove member 100 is formed to be larger than that of a bottom surface thereof.

In this case, the outer circumferential surface of the groove member 100 may be provided with the wire W by forming the first guide groove 110 in a screw thread shape.

Meanwhile, a depth of the first guide groove 110 may be preferably formed so as to meet a height of the wire W.

The guide pulley 200 has a cylindrical shape so as to be combined with the bottom surface of the groove member 100.

In this case, an outer circumferential surface of the guide pulley 200 is provided with the second guide groove 210 so as to dispose the wire W thereon and a depth of the second guide groove 210 is formed so as to meet a height of the wire W.

Meanwhile, the bottom surface of the groove member 100 is provided with a combining protrusion 120 and the combining hole 220 is fitted in the top surface or the bottom surface of the guide pulley 200 so that the groove member 100 may be fixed to the guide pulley 200.

As such, the pulley assembly for wire combination according to the exemplary embodiment of the present invention may move the wire W formed in the first guide groove 110 to the second guide groove 210 of the guide pulley 200 along the first guide groove 110 having a screw thread shape when the groove member 100 is rotated by combining the groove member 100 provided with the first guide groove 110 with the guide pulley 200 provided with the second guide groove 210.

Here, the outer diameter of the bottom surface of the groove member 100 is formed to be larger than that of the guide pulley 200 and thus, the wire W can be naturally moved without being locked, when moving from the first guide groove 110 to the second guide groove 210.

Further, as illustrated in FIGS. 3 and 4, it is preferable that an end of the first guide groove 110 formed on the outer circumferential surface of the groove member 100 is connected with the second guide groove 210 formed on the outer circumferential surface of the guide pulley 200 to easily move the wire W.

Meanwhile, the top surface of the groove member 100 may be protrudedly provided with a bolt head 130 so as to combine the groove member 100 with a separate electric powered tool, thereby easily rotating the groove member 100.

That is, according to the exemplary embodiment of the present invention, when the groove member 100 is rotated by an electric powered tool while the combining protrusion 120 formed in the groove member 100 is inserted into the combining hole 220 of the guide pulley 200 to combine the groove member 100 with the pulley and then, the cable wire W to be assembled is locked to the first guide groove 110 of the groove member 100, the wire W is guided to the second guide groove 210 of the guide pulley 100 along the helical first guide groove 110 of the groove member 100 so as to be automatically mounted in the guide pulley 200. In this case, when the mounting of the cable wire W is completed, the groove member 100 may be separated from the guide pulley 200 to be used again.

As set forth above, the exemplary embodiments of the present invention can reduce the occurrence of the cable wire damage at the time of working while improving the convenience of work by easily combining the cable wire with the pulley, thereby increasing the value of the product.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pulley assembly for combining of a wire, comprising:
    a groove member having a first guide groove helically threaded in an outer circumferential surface thereof and having a truncated cone shape; and
    a cylindrical guide pulley selectively combined with a bottom surface of the groove member and having a second guide groove formed on an outer circumferential surface thereof,
    wherein the wire is configured to move to the second guide groove of the guide pulley along the first guide groove of the groove member when the groove member combined with the cylindrical guide pulley rotates in a direction,
    wherein a combining protrusion is formed on the bottom surface of the groove member and a combining hole is formed in a lateral side of the guide pulley, wherein the combining protrusion of the groove member is selectively connected to with the combining hole of the guide pulley.

2. The pulley assembly for combining of the wire according to claim 1, wherein an outer diameter of the bottom surface of the groove member is formed to be larger than the outer circumferential surface of the guide pulley.

3. The pulley assembly for combining of the wire according to claim 1, wherein an end of the first guide groove formed on the outer circumferential surface of the groove member is connected with the second guide groove formed on the outer circumferential surface of the guide pulley when the groove member is combined with the guide pulley.

4. The pulley assembly for combining of the wire according to claim 1, wherein a top surface of the groove member is protrudedly formed with a bolt head.

* * * * *